United States Patent
Haacke et al.

(10) Patent No.: US 10,768,327 B2
(45) Date of Patent: Sep. 8, 2020

(54) METHOD AND DEVICE FOR DEBLENDING SEISMIC DATA USING SELF-ADAPTING AND/OR SELECTIVE RADON INTERPOLATION

(71) Applicant: CGG SERVICES SA, Massy (FR)

(72) Inventors: Ross Haacke, Reigate (GB); Gordon Poole, East Grinstead (GB); Margherita Maraschini, Swanley (GB)

(73) Assignee: CGG SERVICES SAS, Massy (FR)

(*) Notice: Subject to any disclaimer, the term of this patent is extended or adjusted under 35 U.S.C. 154(b) by 537 days.

(21) Appl. No.: 14/651,382

(22) PCT Filed: Oct. 31, 2014

(86) PCT No.: PCT/IB2014/002810
§ 371 (c)(1),
(2) Date: Jun. 11, 2015

(87) PCT Pub. No.: WO2015/063595
PCT Pub. Date: May 7, 2015

(65) Prior Publication Data
US 2015/0331124 A1 Nov. 19, 2015

Related U.S. Application Data

(60) Provisional application No. 61/969,858, filed on Mar. 25, 2014, provisional application No. 61/898,721, filed on Nov. 1, 2013.

(51) Int. Cl.
*G01V 1/36* (2006.01)
*G01V 1/28* (2006.01)

(52) U.S. Cl.
CPC ............... *G01V 1/36* (2013.01); *G01V 1/282* (2013.01); *G01V 1/364* (2013.01); *G01V 2210/20* (2013.01); *G01V 2210/32* (2013.01); *G01V 2210/57* (2013.01)

(58) Field of Classification Search
CPC ........ G01C 21/16; G01C 21/206; G01P 13/00; B66B 1/3492; B66B 5/0006
USPC .................... 702/16, 17, 14; 367/24, 38, 47
See application file for complete search history.

(56) References Cited

U.S. PATENT DOCUMENTS

| 5,714,712 A | 2/1998 | Ewick et al. |
| 6,882,938 B2 | 4/2005 | Vaage et al. |
| 8,295,124 B2 | 10/2012 | Abma |
| 8,395,966 B2 | 3/2013 | Moore et al. |

(Continued)

FOREIGN PATENT DOCUMENTS

EP 2592439 A2 5/2013

OTHER PUBLICATIONS

Australian Patent Examination Report No. 1 in related Australian Patent Application No. 2014343360, dated Oct. 9, 2015 (the three documents cited in this Examination Report were cited in the IDS filed Jun. 11, 2015.).

(Continued)

*Primary Examiner* — John H Le
(74) *Attorney, Agent, or Firm* — Patent Portfolio Builders PLLC

(57) ABSTRACT

Methods (700) and devices (600) for seismic data processing estimate (720) signal-to-noise ratios of data in a spatio-temporal block of data, determine (730) data-domain weights associated to the data based on the estimated signal-to-noise ratios, and then generate (740) a model of the signal and/or a model of the noise using the data-domain weights.

20 Claims, 8 Drawing Sheets

(56) References Cited

U.S. PATENT DOCUMENTS

| | | |
|---|---|---|
| 9,395,966 B1 | 7/2016 | Watson |
| 2004/0049347 A1 | 3/2004 | Fookes et al. |
| 2004/0233782 A1 | 11/2004 | Herkenhoff et al. |
| 2010/0262373 A1 | 10/2010 | Khadhraoui et al. |
| 2012/0044782 A1 | 2/2012 | Bekara |
| 2012/0215453 A1 | 8/2012 | Poole |
| 2012/0290214 A1 | 11/2012 | Huo et al. |
| 2013/0176819 A1 | 7/2013 | Poole |
| 2013/0182534 A1 | 7/2013 | Zabihi Naeini et al. |
| 2013/0197891 A1 | 8/2013 | Jessop et al. |

OTHER PUBLICATIONS

Canadian Requisition by the Examiner (2) and Examination Search Report in related Canadian Application No. 2,902,293, dated Oct. 5, 2015 (The two documents cited in these Requisitions by the Examiner were cited in the IDS filed Jun. 11, 2015.).

International Search Report and Written Opinion of the International Searching Authority in related International Application No. PCT/IB2014/002810, dated Apr. 8, 2015.

International Search Report and Written Opinion of the International Searching Authority in related International Application No. PCT/IB2014/002820, dated Apr. 8, 2015.

R.L. Abma et al., "Separating Simultaneous Sources by Inversion", 71st EAGE Conference & Exhibition, Amsterdam, The Netherlands, Jun. 8-11, 2009, V002.

P. Akerberg et al., "Simultaneous Source Separation by Sparse Radon Transform", SEG Annual International Meeting, Las Vegas, Nevada, Nov. 9-14, 2008, pp. 2801-2806.

G. Beylkin, "Discrete Radon Transform", IEEE Transactions on Acoustic, Speech, and Signal Processing, Feb. 1987, ASSP-35, No. 2, pp. 162-172.

LL. Canales, "Random Noise Reduction", SEG 54th Annual International Meeting, 1984, pp. 525-527.

A. Canning et al., "Reducing 3-D Acquisition Footprint for 3-D DMO and 3-D Prestack Migration", Geophysics, Jul.-Aug. 1998, vol. 63, No. 4, pp. 1177-1183.

De Kok et al., "A Universal Simultaneous Shooting Technique", EAGE 64th Conference & Exhibition, Florence, Italy, May 27-30, 2002, A-04.

T.S. Durrani et al., "The Radon Transform and its Properties", Geophysics, Aug. 1984, vol. 49, No. 8, pp. 1180-1187.

T. Elboth et al., "Time-Frequency Seismic Data De-noising", EAGE, Geophysical Prospecting, 2010, vol. 58, pp. 441-453.

N. Gulunay et al., "Coherency Enhancement on 3D Seismic Data by Dip Detection and Dip Selection", SEG Annual International Meeting, San Antonio, Texas, Sep. 23-28, 2007, pp. 2625-2629.

G. Hampson et al., "Acquisition Using Simultaneous Sources", The Leading Edge, Jul. 2008, pp. 918-923.

C.J. Haneveld et al., "A Fast Algorithm for the Computation of Radon Transforms", Geophysical Prospecting, 1990, vol. 38, pp. 853-860.

A. Mahdad et al., "Separation of Blended Data by Iterative Estimation and Subtraction of Blending Interference Noise", Geophysics, May-Jun. 2011, vol. 76, No. 3, pp. Q9-Q17.

M. Maraschini et al., "An Interative SVD Method for Deblending: Theory and Examples", SEG Technical Program Expanded Abstracts, 2012.

M. Marashini et al., "Source Separation by Iterative Rank Reduction—Theory and Applications", 74th EAGE Conference & Exhibition incorporating SPE EUROPEC 2012, Copenhagen, Denmark, Jun. 4-7, 2012.

I. Moore et al., "Simultaneous Source Separation Using Dithered Sources", SEG Annual International Meeting, Las Vegas, Nevada, Nov. 9-14, 2008, pp. 2806-2810.

C. Peng et al., "Deblending of Simulated Simultaneous Sources Using an Iterative Approach—an Experiment with Variable-depth Streamer Data", 75th EAGE Conference & Exhibition incorporating SPE EUROPEC 2013, London, UK, Jun. 10-13, 2013.

G. Poole et al., "A Deblending Strategy Using Alternating Constant Delay Simultaneous Source Data", SEG Annual International Meeting, Denver, Colorado, Oct. 26-31, 2014, pp. 4335-4339.

G. Poole, "Multi-dimensional Coherency Driven Denoising of Irregular Data", 73rd EAGE Conference & Exhibition incorporating SPE EUROPEC 2011, Vienna, Austria, May 23-26, 2011, G009.

R. Soubaras, "Signal-Preserving Random Noise Attenuation by the f-x Projection", SEG 64th Annual International Meeting, 1994, pp. 15766-1579.

J. Stefani et al., "Acquisition Using Simultaneous Sources", EAGE 69th Conference & Exhibition, London, UK, Jun. 11-14, 2007, B006.

D. Trad et al., "Fast and Robust Deblending Using Apex Shifted Radon Transform", SEG Annual International Meeting, Las Vegas, Nevada, Nov. 4-9, 2012.

S. Trickett, "F-xy Eigenimage Noise Suppression", Geophysics, Mar.-Apr. 2003, vol. 68, No. 2, pp. 751-759.

S. Trickett et al., "Interpolation Using Hankel Tensor Completion", SEG Annual International Meeting, Houston, Texas, Sep. 22-27, 2013, pp. 3634-3638.

S. Trickett et al., "Robust Rank-Reduction Filtering for Erratic Noise", SEG Annual International Meeting, Las Vegas, Nevada, Nov. 4-9, 2012.

Mahdad et al., "Iterative method for the separation of blended seismic data: discussion on the algorithmic aspects," Geophysical Prospecting, Jul. 2012, vol. 60, No. 4, pp. 782-801.

Office Action in corresponding European Application No. 14 824 094.8 dated Jun. 10, 2016 (references from OA previously cited in IDS filed on Jun. 11, 2015).

European Office Action in corresponding European Application No. 14 824 093.0 dated Jul. 9, 2019. (The references sited in the European Office Action were previously cited in the IDS filed on Jun. 11, 2015.).

Fig. 1A
Fig. 1B
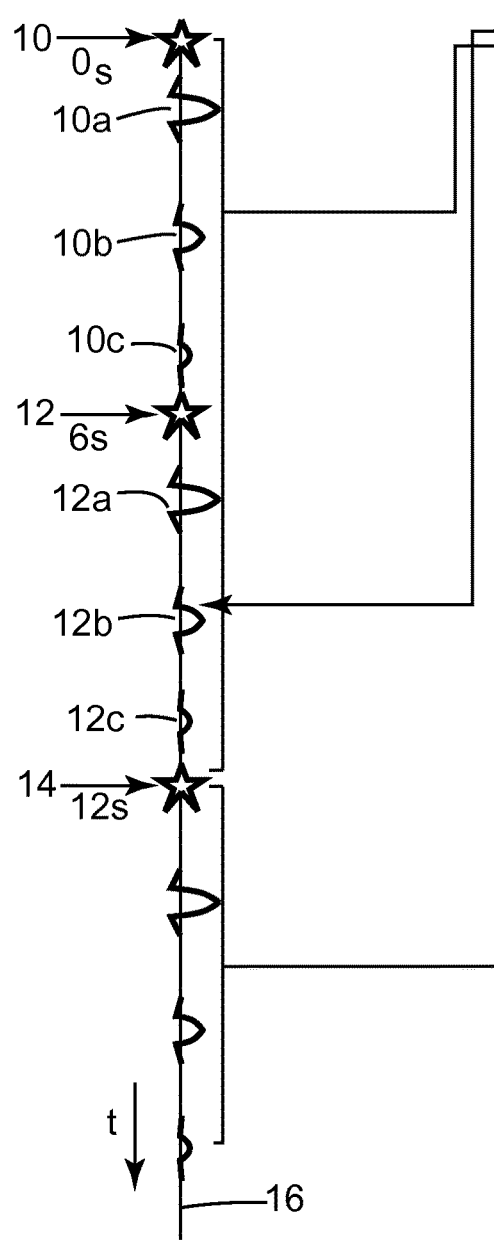
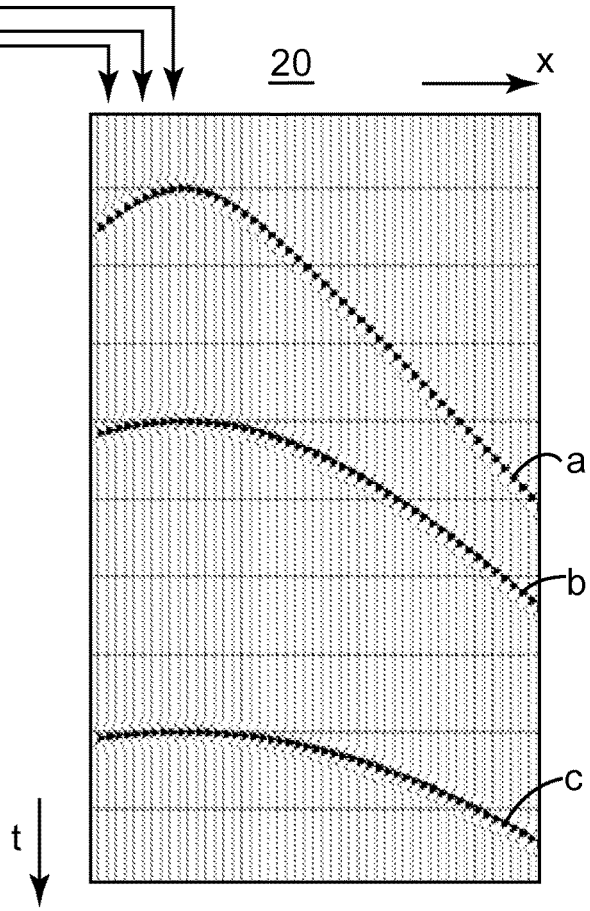

Fig. 2A
Fig. 2B
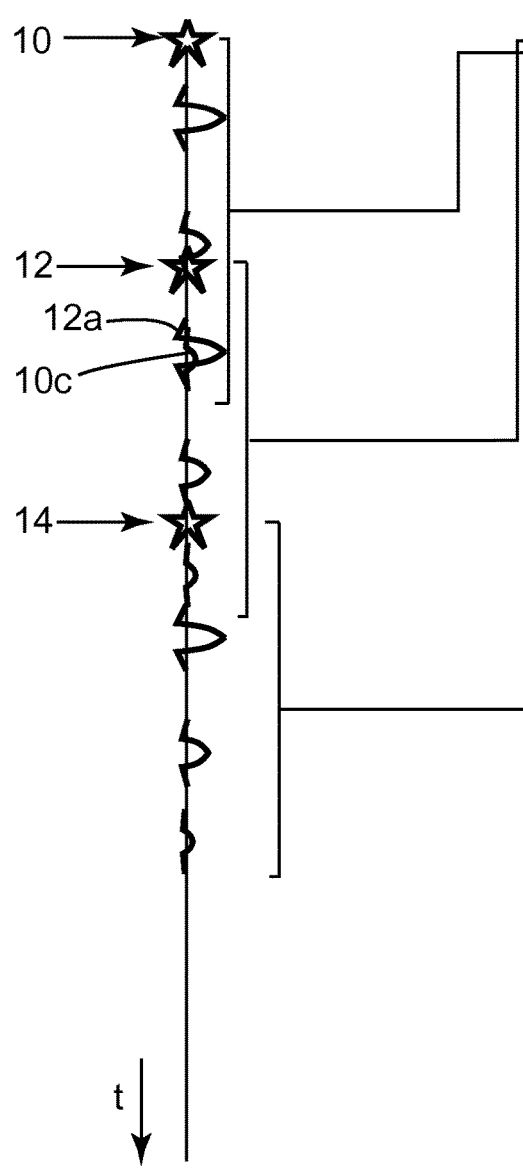
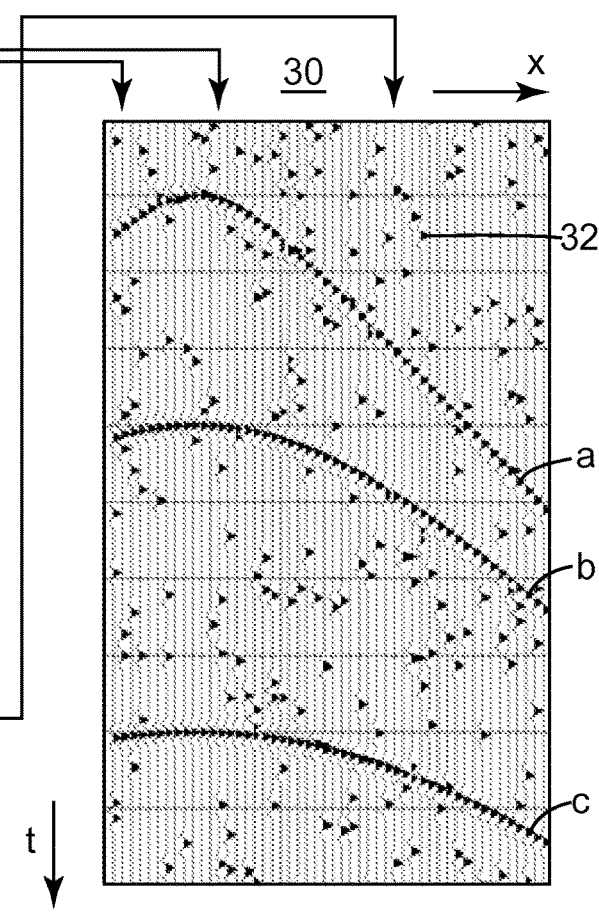

METHOD AND DEVICE FOR DEBLENDING SEISMIC DATA USING SELF-ADAPTING AND/OR SELECTIVE RADON INTERPOLATION

CROSS REFERENCE TO RELATED APPLICATIONS

This application claims priority and benefit from U.S. Provisional Patent Application No. 61/969,858, filed Mar. 25, 2014, for "Deblending by Self-adapting Selective Radon Interpolation," and U.S. Provisional Patent Application No. 61/898,721, filed Nov. 1, 2013, for "Combined Cross Talk Attenuation and Source/Receiver Correction Using Continuous Recording Data," the contents of which are incorporated in their entirety herein by reference.

BACKGROUND

1. Technical Field

Embodiments of the subject matter disclosed herein generally relate to methods and devices used for processing seismic data and, more particularly, to generating models of signal and/or noise using data-domain weights based on estimated signal-to-noise ratios.

2. Discussion of the Background

Seismic data related to energy reflected from interfaces between geological layers of an explored subsurface structure are used in the oil and gas industry to search for and evaluate subterranean hydrocarbon deposits. After seismic waves are injected into the explored underground structure, seismic receivers detect the reflected energy (a signal, which may be coherent with the injected waves), and undesirable noise. Various methods are employed to attenuate or remove noise from the seismic data.

Noise, which is characterized by amplitude and/or phase, can be transformed (as can the signal and seismic data in general) to different domains (space-time domain, frequency domain, etc.). Some of the noise is predictable and coherent with the signal in some domains, while unpredictable and incoherent with the signal in other domains. Noise that is random and unpredictable, or whose predictability has been altered by transforming the data to a particular domain (for example, by sorting) may be easier to remove without altering the coherent signal. Noise that is coherent in one domain but incoherent in another may be attenuated using methods for removing incoherent noise, applied in the domain in which the noise is incoherent. The denoised data may then be sorted back to the domain in which the noise was coherent.

Unpredictable noise can be attenuated using frequency-space filtering (as described, e.g., in the article, "Random noise reduction," by Canales, L., published in 54*th SEG Annual International Meeting* 1984, *Expanded Abstracts*, pp. 525-527; the article, "Signal-preserving random noise attenuation by the F-X projection," by Soubaras, R., published in 64*th SEG Annual International Meeting* 1994, *Expanded Abstracts*, pp. 1,576-1,579; or the article, "Coherency enhancement on 3D seismic data by dip detection and dip selection," by Gulunay et al., published in 77*th SEG Annual International Meeting* 2007, *Expanded Abstracts*, pp. 2,247-2,251, the entire contents of which are incorporated herein by reference). This technique, which can be applied in one or more spatial dimensions in which noise is incoherent, relies on a prediction of the coherent signal at a point in space using surrounding traces on which the noise is sufficiently random as to average out to zero (or close to zero). Such randomness is achieved with large enough collections of data in which the noise has a normal probability distribution. However, when the noise on surrounding traces is particularly strong, or is not truly random, prediction of the coherent signal and, consequently, of the noise is compromised. Hence, the technique is inefficient in the presence of high-density and strong noise, or types of noises that are not truly random in amplitude or phase. Furthermore, this technique is accurate only for data that is regularly distributed in the spatial dimensions in which it is processed (e.g., regular shot and receiver spacing), and for data that is not aliased.

Strong incoherent noise occurs, for example, when data is acquired such that the interval between shots (i.e., seismic sources' activation to generate seismic waves incident on the explored formation) is shorter than the recording ("listening") period corresponding to one shot. In this case (which is known as "simultaneous source acquisition"), the acquired seismic data is blended, including overlapping signals caused by incident waves from different but simultaneously shot sources. The later signal, cross-talk interference and other noise are generally not coherent with the earlier shot and resulting earlier signal in one or more domains, but constitute a strong noise for the earlier signal (and vice-versa, the earlier signal, cross-talk and other noise are generally not coherent with the later shot and resulting later signal, constituting a strong noise for the later signal in an appropriate domain).

Simultaneous source acquisition is desirable because it reduces a survey's total acquisition time and cost, or it may be used to acquire a higher density dataset in the same survey time. Simultaneous source acquisition can be performed in land and marine environments (with ocean bottom receivers or towed streamers), with continuous or non-continuous recording. Using blended data requires additional processing to extract seismic datasets focusing on individual signals (i.e., deblending the data).

In conventional surveying techniques, sources are activated so that a signal corresponding to one shot does not overlap another signal corresponding to another shot in their significant portions (e.g., when the signal amplitudes are substantially greater than the noise). FIG. 1A illustrates seismic waves generated at different spatial positions 10, 12 and 14 at intervals so the recorded wavelets 10*a-c* corresponding to the seismic waves generated at spatial position 10 do not interfere with wavelets 12*a-c* corresponding to the seismic waves generated at spatial position 12. The wavelets generated due to one shot form a signal carrying information about the explored underground structure.

The receivers may record continuously in time (i.e., 16 in FIG. 1A) or separately to form regular seismic traces for each individual shot, as shown in FIG. 1B. The traces illustrated in FIG. 1B form a receiver gather 20. First wavelets, which correspond to reflections from a first interface, form curve a, second wavelets form curve b, etc.

FIG. 2A illustrates seismic waves generated at the same positions as in FIG. 1A, but at shorter intervals so the corresponding recording times partially overlap. Therefore, for example, wavelet 10*c* overlaps wavelet 12*a*. FIG. 2B shows receiver gather 30 formed with regular seismic traces extracted from continuous recording based on each shot's start time. FIG. 2B data has been acquired in less time than FIG. 1B data. Cross-talk like 32, which appears to be noise on the traces, is in fact a signal wavelet of another trace. When simultaneous source acquisition is used, it is necessary to separate (deblend) the energy (wavelets) associated with each shot as a pre-processing step.

In land simultaneous source acquisition, a variety of different sources (for example, different vibroseis sweeps or pseudo-random sweeps) yielding different signatures are used to ease separation of blended data. When energy from a given shot is time-aligned, a source designature operator for that shot can be applied to focus the energy related to that shot while keeping energy from other shots dispersed.

In marine acquisition, the sources' firing time (as described in the article, "A Universal Simultaneous Shooting Technique," by DeKok et al., *EAGE 64$^{th}$ Conference & Exhibition* 2002, the entire content of which is incorporated herein by reference) is used as a key for deblending the data. Most deblending algorithms rely on the randomness of the firing time, using denoising or sparseness constraints that make the energy separable.

Varying shot timing (known as "timing dither"), which is seismic source activations at varying intervals, yields an incoherency in cross-talk noise timing in domains other than the shot domain. For example, FIG. 3 (corresponding to Hampson et al., "Acquisition using simultaneous sources," *Leading Edge,* Vol. 27, No. 7, the entire content of which is incorporated herein by reference) is a sequence of graphs representing the same blended seismic data in different domains: common shot, common receiver, common midpoint and common offset.

Traditionally, datasets focusing on an individual signal are extracted from blended data using methods that fall into the following categories (all relying to some degree on randomized timing):

1. Separation in a model domain,
2. Impulsive denoising,
3. Iterative coherency enhancement/denoising, and
4. Full modeling of energy from all sources.

Separation in a model domain may be used when the energy coming from different sources can be separated through muting in a model domain. For example, one such method (described in the article, "Fast and robust deblending using Apex Shifted Radon transform," by Trad et al., published in *SEG Expanded Abstracts* 2012, the entire content of which is incorporated herein by reference) uses an apex shifted Radon to separate cross-talk noise.

Impulsive denoising technique (disclosed, for example, in the article, "Acquisition using simultaneous sources," by Stefani et al., published in 69*th EAGE Conference & Exhibition,* 2007, the entire content of which is incorporated herein by reference) uses the fact that when data is sorted into any domain other than the common shot, the cross-talk noise from other sources is incoherent, as illustrated in FIG. 3 (corresponding to the previously referred-to article of Hampson et al.). Note that in the common shot domain, cross-talk noise 40 is continuous. Variable firing times allow the use of impulsive-noise attenuation techniques that are already available and used in other processing steps, such as swell-noise attenuation. While this method can effectively remove the strongest cross-talk energy, low-amplitude cross-talk noise is not seen as impulsive and will not be removed.

Iterative coherency enhancement/denoising techniques (described, for example, in U.S. Pat. No. 6,882,938, in the article, "Iterative method for the separation of blended seismic data: discussion on the algorithmic aspects" by A. Mahad et al., published in *Geological Prospecting,* 2012, 60, pp. 782-801, in the article, "Separating simultaneous sources by inversion," by Abma et al., published in 71*st EAGE Conference & Exhibition,* 2009; the article, "Source Separation by Iterative Rank Reduction—Theory and Applications," by M. Maraschini et al., published in 74$^{th}$ *EAGE Conference & Exhibition,* 2012; and the article, "An iterative SVD method for deblending: theory and examples," by M. Maraschini et al., published in *SEG Technical Program Expanded Abstracts* 2012, the entire contents of which are incorporated herein by reference) rely on the fact that cross-talk noise on some traces is a duplication of signal on other traces. This means that with knowledge of the timing of all shots, a signal estimate made for one source can then be used to reduce the level of cross-talk for all other sources.

The full modeling of energy from all sources technique (described, for example, in the article, "Simultaneous source separation by sparse Radon transform," by Akerberg et al., published in 78*th Ann. Internat. Mtg.: Soc. of Expl. Geophys,* 2008; and the article, "Simultaneous source separation using dithered sources," by Moore et al., published in 78*th Ann. Internat. Mtg.: Soc. of Expl. Geophys,* 2008, the entire contents of which are incorporated herein by reference) has similarities to the iterative denoising method, except that this formulation solves the relationship between source energy and cross-talk noise implicitly at the core of the problem formulation. Equations can be formulated as designing a transform domain for each source or spatial area (e.g., tau-p domain, Fourier domain, etc.) such that when it is reverse-transformed and reblended, the raw input data is reconstructed as accurately as possible in a least squares sense.

This technique (i.e., full modeling of energy from all sources) uses the timings and positioning of all sources and also relies on a sparse solution to the equations. Once the transform domains have been calculated, the final step to deblend the data requires application of reverse-transform without reblending. While this method may result in some filtering of the original data, it removes low-amplitude cross-talk noise and preserves the primary signal. This method could be considered an alternative way to solve the same problem as the iterative coherency enhancement/denoising technique (analogous to sparse least squares Radon versus inversion through "iterative cleaning").

It is, however, desirable to develop denoising methods able to extract coherent signal from strong and/or high-density noise, or noise that is not fully random.

SUMMARY

Some of the embodiments described hereinafter are able to predict the coherent signal, and/or accompanying noise, from a selection of surrounding data. In spite of the strong noise of any probability distribution, the embodiments yield accurate predictions in the presence of irregularly distributed data and/or for signals that have a moderate degree of aliasing. In addition to general noise attenuation, these embodiments may be used when the noise arises from simultaneous source acquisition.

According to one embodiment, there is a method for processing seismic data recorded by receivers while exploring an underground formation. The method includes selecting a spatio-temporal block of data from the seismic data, and estimating signal-to-noise ratios of data in the spatio-temporal block of data, for a signal that is coherent with first seismic waves used to explore the underground formation and a noise that is not coherent with the first seismic waves. The method further includes determining data-domain weights associated to the data, based on the estimated signal-to-noise ratios. The method also includes generating a model of the signal and/or a model of the noise using the data-domain weights, and creating an image of the underground formation using the model of the signal and/or the model of the noise.

According to another embodiment, there is an apparatus configured to process seismic data recorded by receivers while exploring an underground formation. The apparatus includes an input/output interface configured to receive the seismic data and/or to output an image of the explored underground formation. The apparatus further includes a data processing unit configured: to select a spatio-temporal block of data from the seismic data, and to estimate signal-to-noise ratios of data in the spatio-temporal block of data, for a signal that is coherent with first seismic waves used to explore the underground formation and a noise that is not coherent with the first seismic waves. The data processing unit is further configured to determine data-domain weights associated to the data, the data-domain weights being determined based on the estimated signal-to-noise ratios, to generate a model of the signal and/or a model of the noise using the data-domain weights, and to create the image of the explored underground formation using the model of the signal and/or the model of the noise. The data processing unit uses the data-domain weights to generate the model of the signal and/or a model of the noise by applying an anti-leakage Radon transform to the data.

According to another embodiment, there is a non-transitory computer readable medium storing executable codes which when executed by a computer make the computer to perform a method for processing seismic data recorded by receivers while exploring an underground formation. The method includes selecting a spatio-temporal block of data from the seismic data, and estimating signal-to-noise ratios of data in the spatio-temporal block of data, for a signal that is coherent with first seismic waves used to explore the underground formation and a noise that is not coherent with the first seismic waves. The method further includes determining data-domain weights associated to the data, based on the estimated signal-to-noise ratios. The method also includes generating a model of the signal and/or a model of the noise using the data-domain weights, and creating an image of the underground formation using the model of the signal and/or the model of the noise.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 1A-B are graphical illustrations of seismic data without simultaneous acquisition;

FIGS. 2A-B are graphical illustrations of blended seismic data;

DETAILED DESCRIPTION

Figure 3:
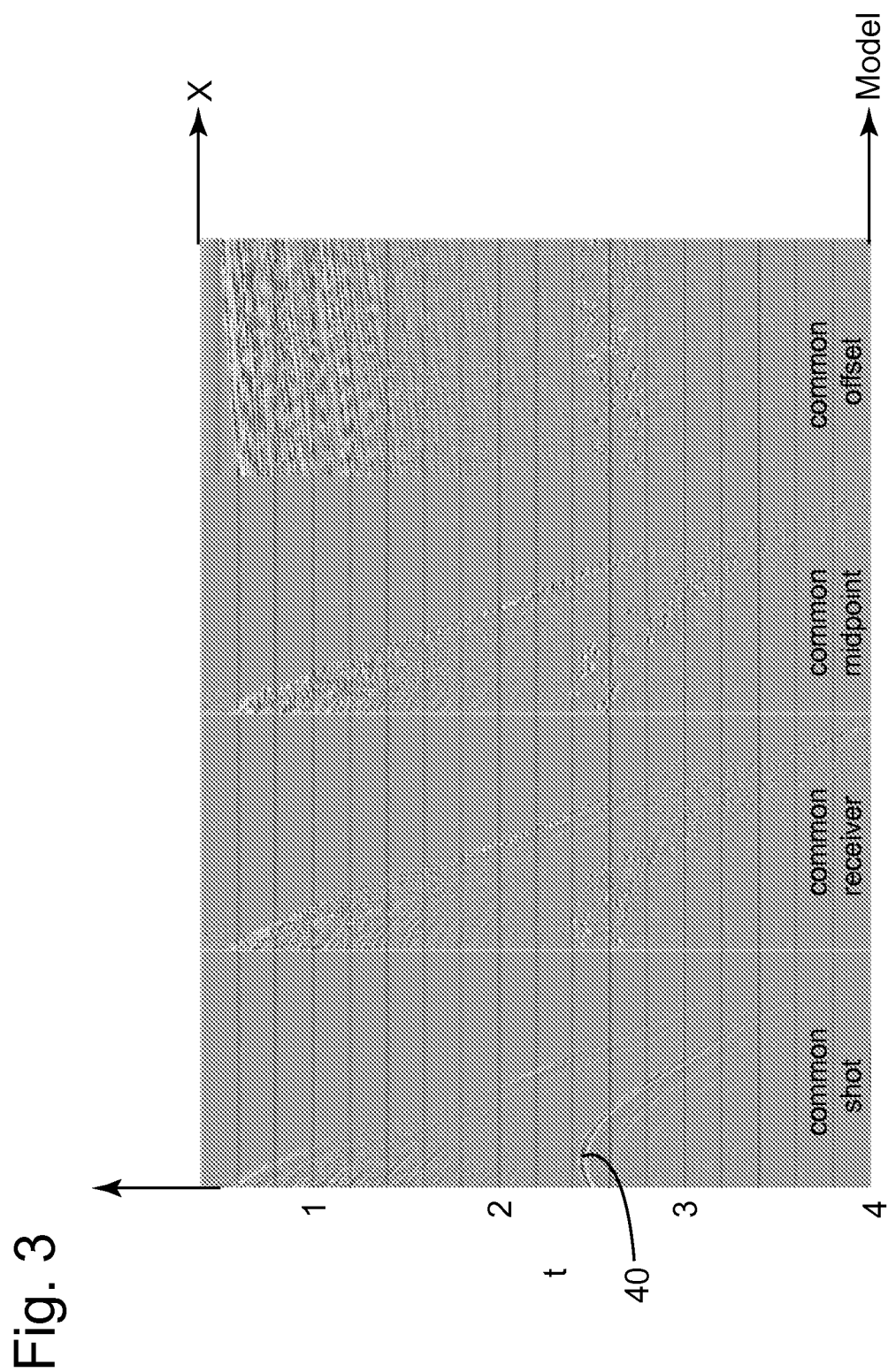
FIG. 3 is a graphical illustration of cross-talk in seismic data.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed in the context of denoising and/or deblending land or marine seismic data. However, similar methods may also be used to analyze datasets related to electromagnetic waves or other data affected by strong and/or high-density noise, or noise that is not fully random.

Reference throughout the specification to "one embodiment" or "an embodiment" means that a particular feature, structure or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures or characteristics may be combined in any suitable manner in one or more embodiments.

Some of the embodiments described in this section operate on a selected spatio-temporal block of data acquired during a seismic survey (i.e., data recorded by receivers while exploring an underground formation). Signal-to-noise ratios are estimated for the selected data, with the signal being coherent with targeted seismic waves and the noise being incoherent with these same seismic waves when transformed to a suitable domain such as a common receiver gather. Data-domain weights are then determined based on estimated signal-to-noise ratios. These data-domain weights are then used to generate a model of the signal and/or a model of the noise. The model(s) may be used to ultimately create an image of the explored underground formation.

Signal-to-noise ratios associated with data that is close spatially and/or temporally to a noisy portion of data are estimated. A signal-to-noise ratio may be associated to data on a trace (which is a collection of amplitude-versus-time data points sampled for the same shot and the same receiver) or to an individual data point. Signal-to-noise ratios may be evaluated by measuring the strength or amplitude of energy coherent with the shot with respect to the strength or amplitude of incoherent energy and dividing the former by the latter. The ratio of signal amplitude to cross-talk amplitude may be calculated on the data itself, the absolute of the data, an envelope of the data, or in another way. For example, the difference of auto-correlations and cross-correlations computed from an ensemble of data provides the noise-level estimate, while the cross-correlation provides the signal-level estimate. Similarly, signal levels may be estimated by a model of coherent energy from a sparse inversion, with noise levels estimated by the data residual after the sparse inversion.

Data-domain weights are then determined based on the estimated signal-to-noise ratios, and, thus, a data-domain weight may also be associated with data on a trace or to an individual data point. Data-domain weights may be a combination of weighting based on the geometry of the shot and receiver positions (for example, representing the trace density) and/or the estimated signal-to-noise ratio, and/or a measure of statistical probability or likelihood of the data values given some modelled distribution of noise (e.g. a Gaussian or Laplacian distribution). For example, given an ensemble of traces close spatially and/or temporally to a point in the processing block of data, the amplitudes or the signal-to-noise ratios may be used to calculate a mean and a variance. These quantities define the characteristics of a Gaussian probability density function for amplitude or signal-to-noise values around the point in the processing block. The estimated likelihood of each of the ensemble of datapoints is then proportional to the exponential of a negative normalized deviation, where the normalized deviation is the squared of the datapoint's difference in amplitude or signal-to-noise from the mean value normalized by twice the variance. The mean is the maximum likelihood estimate of the datapoint given a Gaussian probability density function and is also the maximum likelihood estimate given an L2 norm.

In another embodiment, the individual datapoints in an ensemble of datapoints close spatially and/or temporally to a point in the processing block of data may be sorted according to the magnitude of their corresponding signal-to-noise ratios. The lowest and highest percentiles of data may then be given lower weights according to their distance from the median value, or may be removed entirely (data weights set to zero) to reflect their normalized deviations from the median value (normalized by the mean of absolute deviations estimated for all datapoints in the processing block). The median is the maximum likelihood estimate of the datapoint given a Laplacian probability density function, and is also the maximum likelihood estimate given an L1 norm.

In some embodiments, in order to denoise data (i.e., attenuate or remove noise from the data) in the presence of strong noise, the noisy portion of the data is masked or scaled down in amplitude. The noisy portion of the data may be a trace or a portion thereof. Masking the noisy portion may be achieved by replacing data in this portion with zeros and/or making the associated weights zero so as not to use the noisy portion when generating the model(s). The noisy portion of the data is then recreated by interpolation of the signal and noise models.

A Radon-type transform may be used to recreate data by interpolation of the signal and noise models. Radon transforms are described in the article, "The Radon Transform and its properties," by Durrani et al., published in *Geophysics* 49, 1984, pp. 1,180-1,187; the article, "Discrete Radon Transform," by Beylkin, G., published in *IEEE Transactions on Acoustics, Speech, and Signal Processing* 35, 1987, pp. 162-172; and the article, "A fast algorithm for the computation of Radon Transforms," by Haneveld et al., published in *Geophysical Prospecting* 38, 1990, pp. 853-860, the entire contents of which are incorporated herein by reference. The Radon transform is a transform from the time-space domain to any space parameterizing a set of surface-integrals evaluated through the volume of time-space data. Examples of Radon transforms are the tau-p transform (i.e., a linear Radon transform to the intercept-slowness space), the tau-q transform (i.e., a parabolic Radon transform to intercept-parabola space), the hyperbolic Radon, the FK Radon and other forms of Radon domain transforms in two, three, or higher dimensions. The surface integral may be performed by weighting each data point in the integral according to the trace density around that data point when the transform is applied to data traces with irregular positions in space. For example, the Voronoi weighting scheme (described by Canning, A. et al. in the article "Reducing 3D acquisition footprint for 3D DMO and 3D prestack migration", published in *Geophysics* 63, 1998, pp. 1177-1193, the entire content of which is incorporated herein by reference) may be used. Transforms using regular data are a subset of the irregular case, in which the trace-density weights are equal.

The step of evaluating a surface integral through the volume of time-space data is known as a slant-stack. The Radon transform may be derived using an inversion with L2, L1, L0, Cauchy, or another norm. Alternatively, the Radon transform may be derived with iterative forward model estimation and then subtraction.

Some embodiments employ an anti-leakage Radon transform as described in the article, "Multi-dimensional coherency driven denoising of irregular data," by Poole, G., published in 73*rd EAGE Conference & Exhibition*, 2011. According to this method, a series of coefficients (referred to as a dipmap) are used to guide the sequence in which a series of slant-stacks are sequentially evaluated through the data surrounding the masked area. The adjoint or reverse slant-stack is then subtracted from the input data before evaluating the next slant-stack. The slant-stacks or their adjoints are used to build a model of the input data either in the slowness domain or in the same domain as the input data. The difference between the model, which is considered the underlying signal, and the input data is the residual, which is considered to be a measure of noise in the input data. The slant-stack represents an integral through the time-space volume of data, which includes a weighting term to account for irregular trace positions and their variable contribution to the integral.

In some embodiments, the above-described anti-leakage Radon transform, reduces its sensitivity to strong impulsive noise (such as noise due to another signal when data is acquired with simultaneous shots) in surrounding traces, by decreasing at least one weight among the data-domain weights used to perform the slant stack operation. The weights may be selected or modified based on a statistical analysis of the data and on the likelihood of a data-point given the surrounding data-points and an assumed probabilistic distribution of data errors. For example, after sorting data-point values in a slant-stack along a path or surface through the data in an order of increasing size, a lower percentile of the data-points corresponding to lower values and/or an upper percentile of the data-points corresponding to higher values may be eliminated by setting the corresponding weights to zero in the weighted-summation. The remaining values (e.g., in the central range of values) can be summed, or summed after multiplication with a data weight, then normalized by an overall weight derived from the set of data-weights. This alpha-trimmed slant-stack may be called a "selective" slant-stack, and may be implemented as part of an anti-leakage Radon transform, or as part of other types of Radon transform, used with irregular or regular data. The selective slant-stack could be used for all or some of the slownesses being used in the transform. In one embodiment, the selective slant-stack is used only for the slownesses with largest coefficients in an associated dipmap.

In some embodiments, additionally or alternatively to the above-described selective slant-stack, the Radon transform reduces its sensitivity to strong impulsive noise in surrounding traces by self-adapting the weights used in the summation along the slant-stack. The slant-stack process requires each trace in the slant-stack to contribute with some weight, which could be of uniform magnitude, but which often is related to the spatial distribution of the traces. An estimate of the coherent signal (and, thus, of the incoherent noise, too) in the surrounding set of traces may be obtained using an anti-leakage Radon transform to iteratively evaluate slant-stacks through the traces surrounding the target trace (along which at least a noisy portion was masked). The self-adapting set of slant-stack weights uses the changing signal and noise estimates to update the trace-weights according to a measure of the noise present on each of the traces. The net set of data weights used in the slant stack may thus be based on a measure of trace density (e.g., the Voronoi weights), modified to downweight or eliminate the noisiest traces given the current estimates of signal and noise levels, and also modified to downweight or eliminate outliers or low-likelihood data in the slant stack.

The data weights may be based on a changemap, which provides a measure of noise at each sample of each trace. This could be created, for example, by normalizing the noise estimate (made after transforming some percentage of slownesses in the dipmap) with the signal estimate, or its envelope. A threshold level or other property such as the number of consecutive samples above a threshold or fraction of samples above a threshold in a small region of the changemap can then be used to identify noisy elements in the changemap. Traces with large areas above the threshold in the changemap, or with other properties in the changemap, can be identified as noisy and given a different weight in the subsequent slant-stacks.

Incorporating selective alpha-trim selection and/or self-adapting weights into an anti-leakage Radon transform improves the signal model in spite of strong or dense impulsive noise, such as cross-talk noise from simultaneous shots. The improved signal and/or noise model may then be used to attenuate noise, model signal or noise, or to deblend data acquired by simultaneous-source acquisition.

In the case of simultaneous-source data, the progress of the anti-leakage Radon transform through the dipmap could in some instances be controlled by the level of mutual information between the first signal and noise estimates (i.e., the first signal corresponding to first waves from an earlier shot) with the second noise and signal estimates (corresponding to second waves from a later shot), wherein at least some of the receivers record overlapping signals. For example, the anti-leakage Radon transform may be terminated once the level of mutual information reaches a minimum level. This requires simultaneous processing of the first and the second signals and noises, respectively. Mutual information is a measure of similarity or dependence between two quantities such as the signal model from a first source or set of sources and the noise model from a second simultaneous source or set of sources.

Data masking, selective alpha-trim selection and/or self-adapting weights may also be incorporated into a method for determining the model of the signal using a least-squares Radon transform that models and inverts many slownesses at once (equivalently for other types of Radon transform, including parabolic, hyperbolic and apex-shifted types and others in time or frequency domains, sparse or otherwise, using L1 or L2 norms or other appropriate norms). Such a method derives a tau-px-py model sensitive to only unmasked areas, with reduced dependency on noise, and without trying to reproduce the masked zones. These methods may be implemented in a conjugate gradient solver solving the equation d=Lm (where d is data, L is a forward modeling operator representing the adjoint slant-stack and m is a model of the signal). The forward modeling operator L may be estimated in the following manner:

1) reversing the tau-p slant, one each for a number of spatial blocks;
2) spatial tapering of the data output from 1);
3) combining the data from 2) to form a receiver gather; and
4) weighting based on the signal-to-noise ratio (i.e. scaling down noise).

Then, the adjoint modeling operator $L^T$ may be estimated in the following manner:

1) weighting based on signal-to-noise ratio;
2) copying data into spatio-temporal blocks;
3) tapering of the data in the blocks based on overlap with other blocks; and
4) forward tau-p slant each spatial block.

A masking or other data domain weighting scheme (where each sample of the data has a weight based on how strongly it is contaminated by cross-talk noise) may be used for the weighting step. Model domain sparseness weights may be applied to avoid aliasing and reduce contamination from remaining cross-talk noise. These may be derived beginning at the low frequencies and incrementally increasing the maximum frequency to help dealias the model. Once the model has been found, it may be reversed, transformed and combined to form a signal model for the receiver gather. This signal model may then be used to create the output. Alternatively the model may be used to create a cross-talk estimate which is subtracted from the pseudo-deblended input data.

In the case of simultaneous source data, the signal model generated using either the anti-leakage Radon transform or inversion-based methods may be used to generate a cross-talk estimate that can then be subtracted from the input receiver gather data. Processing may be repeated iteratively until a predetermined criterion is met. Sparseness weights may be relaxed in the later iterations of this process.

Figure 4:
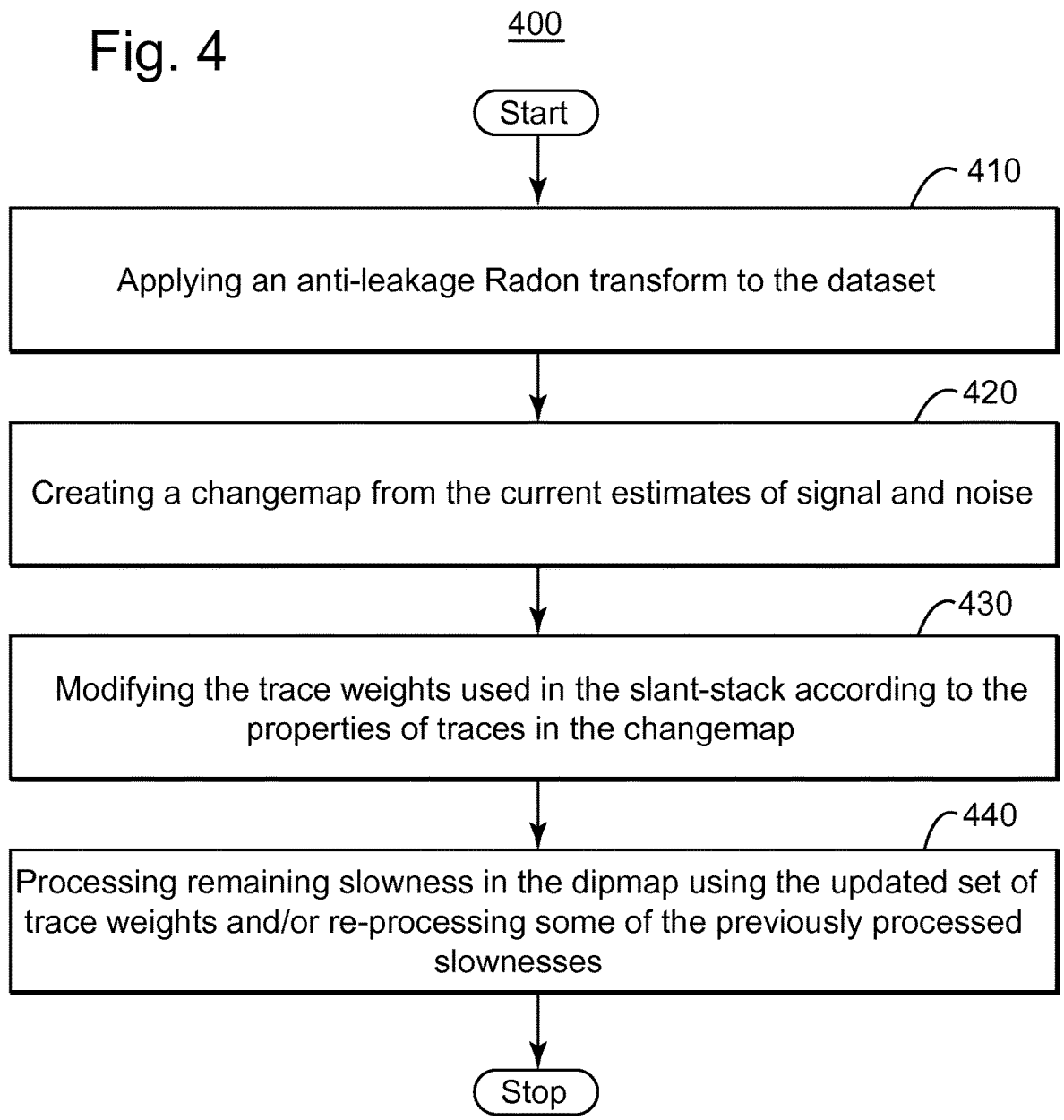
FIG. 4 is a flowchart of a method according to an embodiment.

A flowchart of a method 400 for processing seismic data according to an embodiment is illustrated in FIG. 4. Method 400 processes a dataset including at least a part of seismic data recorded by receivers while exploring an underground formation. Method 400 includes applying an anti-leakage Radon transform to the dataset, at 410. In one embodiment, step 410 is implemented by the following steps:

a. creating a dipmap storing coefficients assigned to a set of slownesses, or slants, through the dataset, the weights corresponding to the spatial trends of coherent arrivals in the dataset;
b. sorting slownesses in order of decreasing coefficients in the dipmap;
c. for each of a specified number of slownesses, computing a slant-stack as a weighted sum of data values along a slowness-defined surface through the data (wherein weights in the slant-stack may be assigned according to the spatial distribution of traces);
d. computing an adjoint slant-stack based on the computed slant-stack for each slowness; and
e. subtracting the adjoint slant-stack from the data (the residual data provides a noise estimate); and
f. adding the adjoint slant-stack to the signal estimate.

The input data is the block of data being processed from which the adjoint slant-stack has been subtracted for each slowness coefficient. The input data thus refers to a residual of the full block of data, this residual being also the noise estimate. The output data refers to the signal estimate obtained by adding the adjoint slant-stack to a clean block of data (one that starts being completely filled with zeros) for each slowness coefficient.

A selective anti-leakage Radon transform may alternatively be used in step 410. The selective anti-leakage Radon transform may use alpha-trimmed summation (i.e., removing some lower percentage and/or some higher percentage of the data values from the summation). Note that a non-trimmed summation may be used for another range of slowness distinct from the predetermined range.

After a specified number of slownesses in the dipmap have been processed, a changemap is created from the current estimates of signal and noise at 420. The changemap may be obtained by dividing the noise estimate envelope by the envelope of the signal estimate.

At 430, method 400 further includes modifying the trace-weights used in the slant-stack according to the properties of traces in the changemap (step referred to as a process of self-adaption). In this step, values in the changemap are compared with a threshold to identify noise-dominated traces based on the ratio of values above and below the threshold. Optionally, to count a value as above the threshold (i.e., a noise sample), it must be adjacent or close to other values above the threshold. Modifying the trace-weights reduces the effect of noise-dominated traces on the weighted summation in slant-stacking.

Method 400 further includes continued processing of remaining slownesses in the dipmap using the updated set of trace-weights and/or re-processing some of the previously processed slownesses in the dipmap, at 440.

Figure 5:
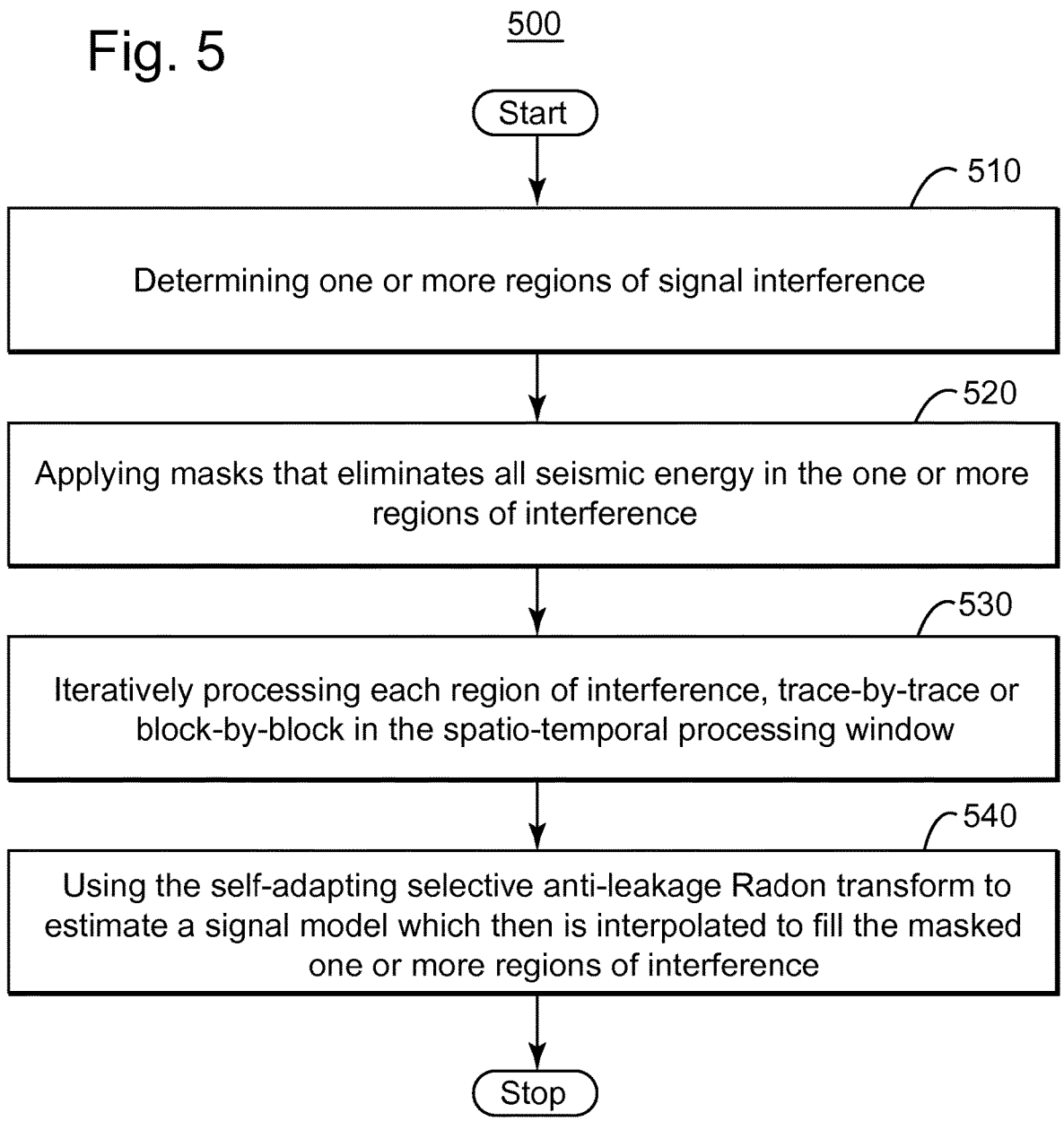
FIG. 5 is a flowchart of a method according to an embodiment.

A flowchart of a method 500 for deblending seismic data according to an embodiment is illustrated in FIG. 5. For each of a set of spatio-temporal windows in a spatially-sorted gather of data, method 500 includes:

a. determining one or more regions of signal interference (corresponding to the two signals being simultaneously detected) in the spatio-temporal window, at 510;
b. applying masks that eliminate all seismic energy in one or more regions of interference, at 520;
c. iteratively processing each region of interference, trace-by-trace or block-by-block, in the spatio-temporal processing window, at 530; and
d. using the self-adapting selective anti-leakage Radon transform to estimate a signal model which is then interpolated to fill the masked one or more regions of interference, at 540.

Method 500 may optionally also include reducing the blend noise on surrounding traces by using the noise estimate from the self-adapting selective anti-leakage Radon transform.

In some embodiments, mutual information, coherence or similarity between signal and noise models are used to improve, modify or guide the deblending of data acquired with simultaneous sources. A first measure of mutual information, coherence or similarity may be estimated for a first signal model coherent with a first shot and a second noise model incoherent with a second shot (but likely coherent with the first shot). Similarly, a second measure of mutual information, coherence or similarity may be estimated for a second signal model coherent with the second shot and a first noise model incoherent with the first shot (but likely coherent with the second shot). The above measures of mutual information, coherence or similarity may be used to determine the minimum number of slownesses in the dipmap that can be processed to achieve a prescribed level of accuracy in the result, or to modify the trace-weights, masking or selection process used in the slant-stack.

Figure 6:
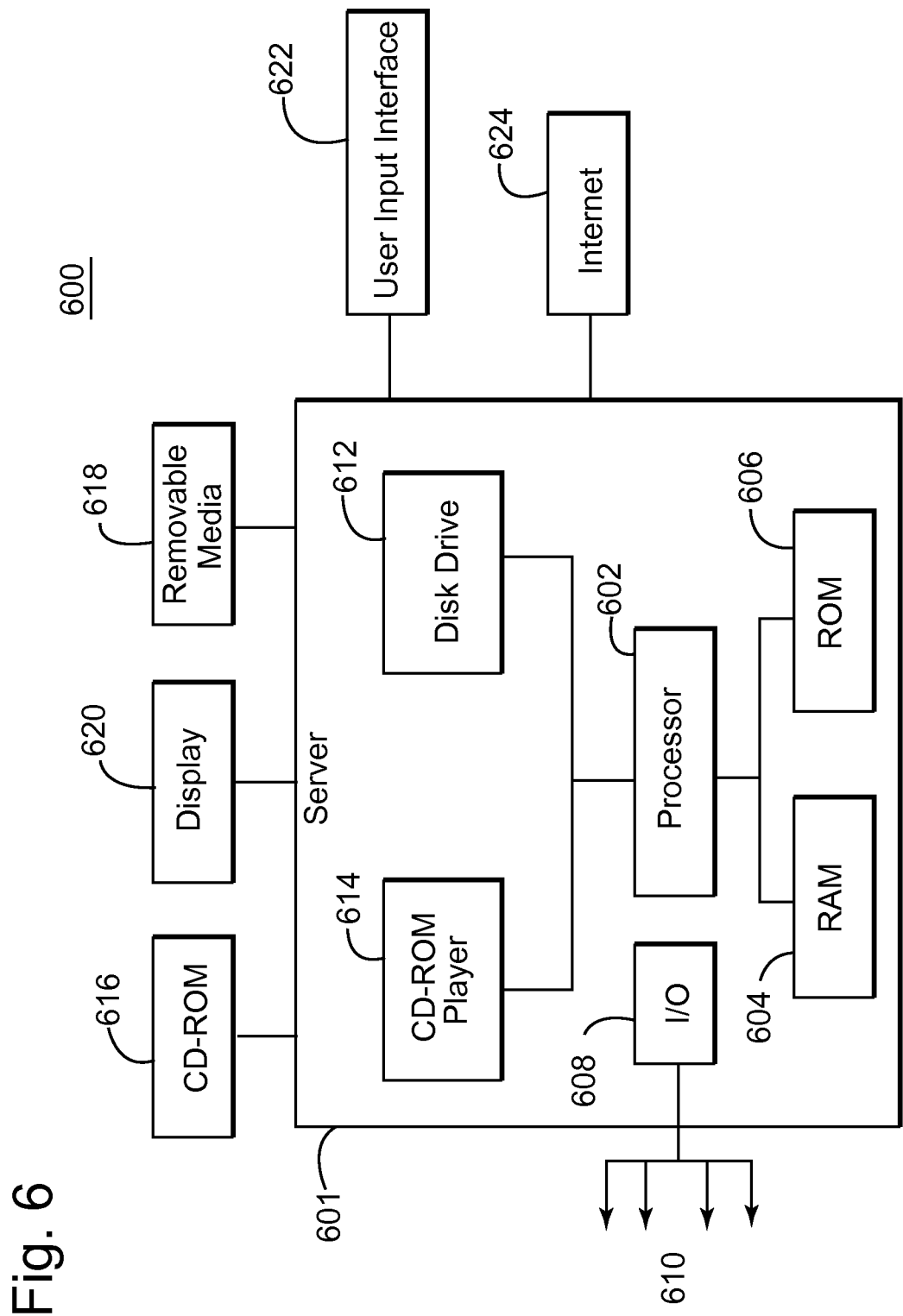
FIG. 6 is schematic diagram of an apparatus according to an embodiment.

A schematic diagram of a seismic data processing apparatus 600 configured to perform the methods according to various above-discussed embodiments is illustrated in FIG. 6. Hardware, firmware, software or a combination thereof may be used to perform the various steps and operations. Apparatus 600 may include server 601 having a data processing unit (processor) 602 coupled to a random access memory (RAM) 604 and to a read-only memory (ROM) 606. ROM 606 may also be other types of storage media to store programs, such as programmable ROM (PROM), erasable PROM (EPROM), etc. Methods according to various embodiments described in this section may be implemented as computer programs (i.e., executable codes) non-transitorily stored on RAM 604 or ROM 606.

Processor 602 may communicate with other internal and external components through input/output (I/O) circuitry 608 and bussing 610. Input-output (I/O) interface 608 is configured to receive the seismic data.

Processor 602 carries out a variety of functions as are known in the art, as dictated by software and/or firmware instructions. Processor 602 is configured to select a spatio-temporal block of data from the seismic data, and to estimate signal-to-noise ratios of data in the spatio-temporal block of data, for a signal that is coherent with first seismic waves used to explore the underground formation and a noise that is not coherent with the first seismic waves. Processor 602 is further configured to determine data-domain weights associated to the data, the data-domain weights being determined based on the estimated signal-to-noise ratios, to generate a model of the signal and/or a model of the noise using the data-domain weights, and to create the image of the explored underground formation using the model of the signal and/or the model of the noise. Processor 602 uses the data-domain weights when applying an anti-leakage Radon transform to the data.

Server 601 may also include one or more data storage devices, including disk drives 612, CD-ROM drives 614, and other hardware capable of reading and/or storing information, such as a DVD, etc. In one embodiment, software for carrying out the above-discussed methods may be stored and distributed on a CD-ROM 616, removable media 618 or other forms of media capable of storing information. The storage media may be inserted into, and read by, devices such as the CD-ROM drive 614, disk drive 612, etc. Server 601 may be coupled to a display 620, which may be any type of known display or presentation screen, such as LCD, plasma displays, cathode ray tubes (CRT), etc. Server 601 may control display 620 to exhibit images of the explored subsurface structure. A user input interface 622 may include one or more user interface mechanisms such as a mouse, keyboard, microphone, touchpad, touch screen, voice-recognition system, etc.

Server 601 may be coupled to other computing devices, such as the equipment of a vessel, via a network. The server may be part of a larger network configuration as in a global area network such as the Internet 624, which allows ultimate connection to various landline and/or mobile client/watcher devices.

Figure 7:
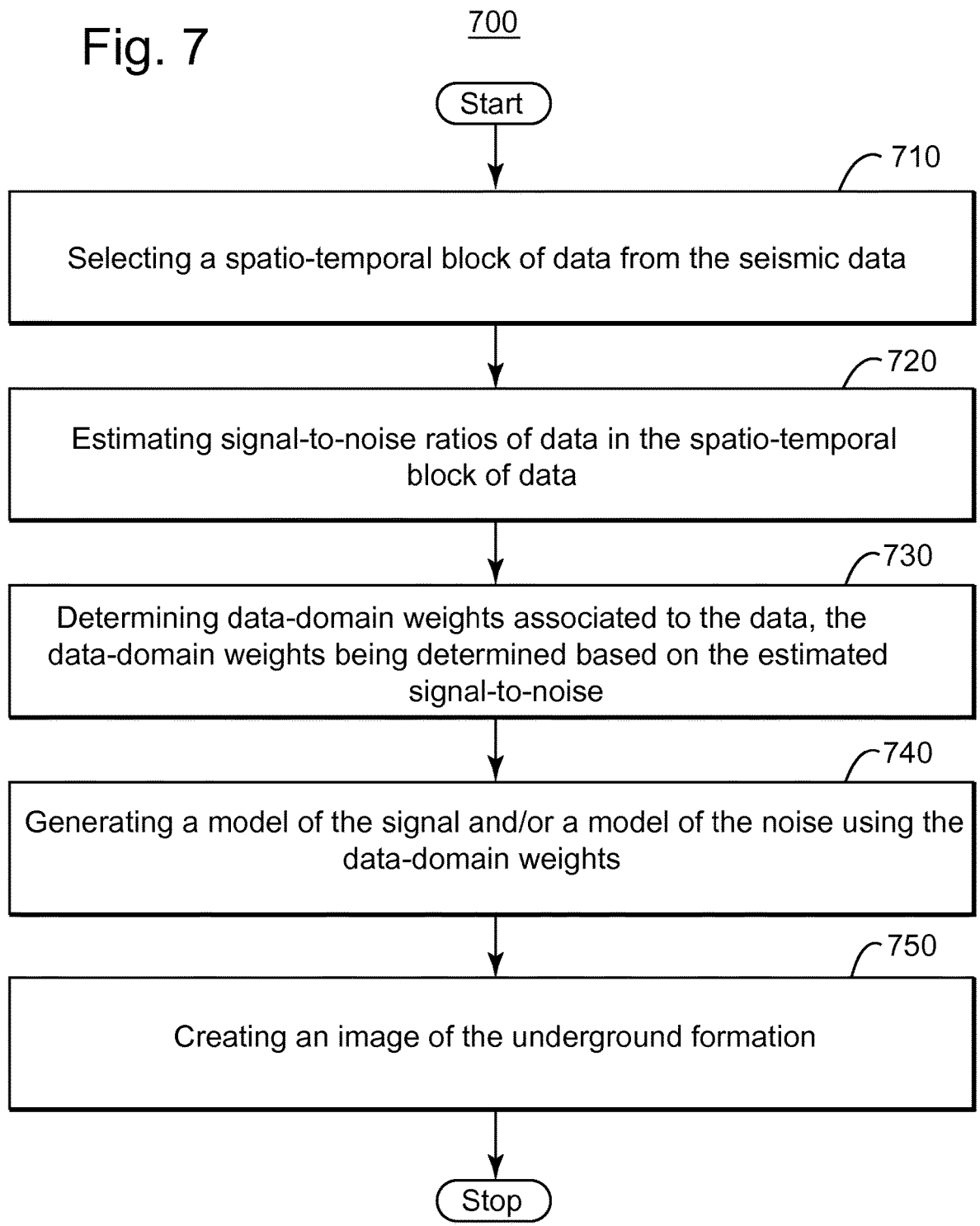
FIG. 7 is a flowchart of a method according to an embodiment.

A flowchart of a method 700 according to an embodiment is illustrated in FIG. 7. Method 700 includes selecting a spatio-temporal block of data from the seismic data at 710 and estimating signal-to-noise ratios of data in the spatio-temporal block of data, at 720. Note that selecting a block of data means that the method is applied locally, it is not required (yet not excluded, either) to use the whole dataset acquired during a survey. The signal is coherent with targeted seismic waves and the noise is not coherent with these seismic waves. Method 700 further includes determining data-domain weights associated to the data, the data-domain weights being determined based on the estimated signal-to-noise ratios at 730, and generating a model of the signal and/or a model of the noise using the data-domain weights at 740. The generated models may be used to create an image of the underground formation at 750. The models may be used to remove the noise from the data, or to deblend simultaneously acquired data.

The following embodiments refer to combined cross-talk attenuation and source/receiver correction using continuous recording data. In order to discuss these embodiments, definitions related to continuous recording are first presented to ease the description. Conventional seismic acquisition with an impulsive source consists of a source firing followed by energy recorded at the receivers. The time interval for all energy of interest associated with the source to reach the receivers is known as the "listening time" and includes time for the earth response plus the duration of the source signature. A recording acquired during a listening time is called a "trace," and lasts for about 4-10 seconds. Instead of separate recording for a fixed duration of time, it is also possible to record continuously while acquisition takes place. The concept of continuous recording is used extensively in land and ocean bottom survey (OBS) acquisition. Continuous recording is considered if the recording lasts at least as long as the listening time relating to a minimum of two separate source excitations (i.e., shots).

Iterative cross-talk attenuation methods according to various embodiments use continuous recording data, i.e., are applicable to any continuous recording dataset, marine, land, OBS (cable or node) or combination thereof. The seismic wave source may be impulsive (e.g., dynamite, air guns, pingers, boomers, etc.) or non-impulsive (e.g., vibroseis truck, marine vibrator, non-synchronized impulsive sources (sometimes termed "popcorn"). The methods are usable for hydrophone, geophone, accelerometer, or other recording systems, and are compatible with "encoded sources" where each source emits a different signal (including the case where each source may vary the signal it emits from shot to shot). If continuous recording data were interrupted, it may be reconstructed using segmented trace recordings, if all energy relating to the listening times has been recorded.

Figure 8:
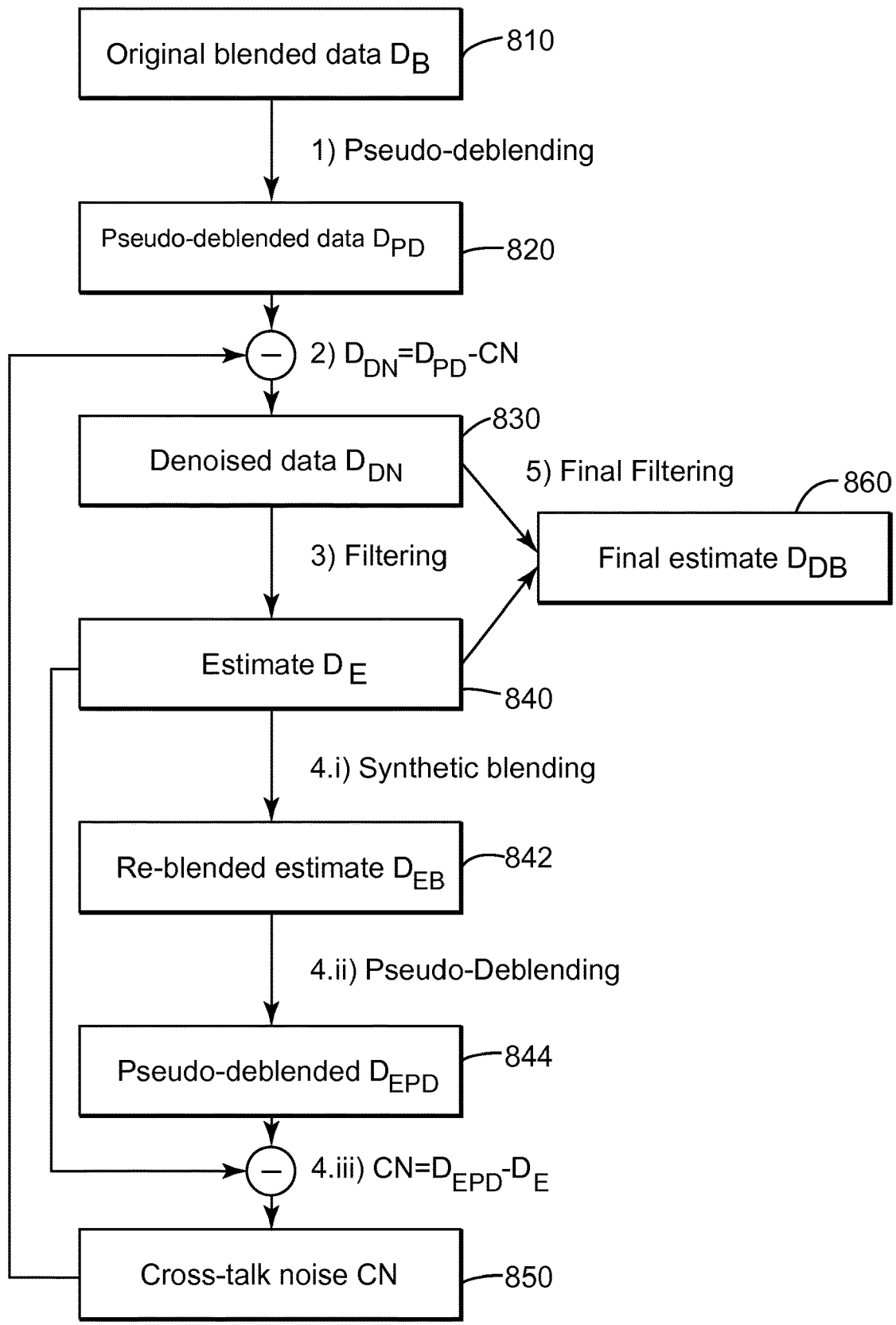
FIG. 8 illustrates a combined cross-talk attenuation and source/receiver correction method according to an embodiment.

Data processing using a combined cross-talk attenuation and source/receiver correction method according to an embodiment is illustrated in FIG. 8.

The original blended data, $D_B$ (labeled 810 in FIG. 8), is continuous recording data. A continuous recording may last as briefly as one hour or as long as several days. The sample interval is based on the maximum frequency of data to be recorded. The recording also stores information about the incident seismic waves. This information includes shot times (e.g., ms relative to the continuous recording trace), shot positions (i.e., as coordinates x, y or even also z if necessary, or, alternatively, midpoint coordinates), shot signatures (may be vertical signatures or directional signatures, can be constant for each source or vary from shot to shot) and shot-associated operators. Hereinafter, when referring to designature or resignature operators, optional corrections described below may be included.

The source signatures may include just the raw source response (e.g., air gun array effect or vibroseis sweep, which may optionally include vibroseis array effects if more than one vibrator is used). In marine data, source signatures may also include the source ghost. If ghost functions (vertical or directional) are included, the combined effects of deblending, source array compensation, and deghosting are corrected in a single process.

Shot static corrections may be included in the procedure by shifting the signatures. Applying these corrections may be of particular interest in the case of a non-horizontal datum (e.g., land or OBS) but also in the case of a non-homogenous near surface, etc.

Source amplitude variations may be related to coupling between the source and medium, which may be the case with land acquisition, in particular. Many algorithms are known in the field for estimating coupling coefficients. Once compensation filters are derived, they may be applied to the source signatures. In this case, the step of pseudo-deblending also re-applies the compensation filters. This correction is optional.

If filtering takes place across more than one receiver, analogous operations to those described above may be applied to the receiver side. Hereinafter, when referring to receiver response corrections, the following processes may be included:

a. compensation for receiver response (vertical or directional), b. receiver group summation response, c. receiver ghost (may relate to constant or variable receiver depth), d. receiver statics (analogous to source statics), e. receiver coupling filters (analogous to source amplitude variation), and f. receiver frequency response.

The pseudo-blended data, $D_{PD}$ (labeled 820 in FIG. 8), is the original input data after applying signature and receiver response corrections followed by separation into traces, with trace length corresponding to listening time. As previously mentioned, an analogous correction may also be used on the receiver side.

The current denoised data $D_{DN}$ (labeled 830 in FIG. 8) is input at each iteration of steps 3, 4.*i*, 4.*ii* and 4.*iii*. The current denoised data is obtained by subtracting the current cross-talk noise estimate, CN (labeled 850 in FIG. 8) from the pseudo-deblended data, $D_{PD}$. The subtraction may be a straight subtraction or an adaptive subtraction, L2 norm, L1 norm, etc.

The current estimate of deblended data, $D_E$, (labeled 840 in FIG. 8) is obtained after filtering the denoised data $D_{DN}$. Various usable denoising algorithms are discussed later. The current cross-talk estimate CN (labeled 850 in FIG. 8) is estimated at each iteration.

The method includes a pseudo-deblending operation (1) performed once when processing begins, operations (2), (3), (4.*i*), (4.*ii*) and (4.*iii*) are performed iteratively, and a final filtering operation (5) performed once at the end of processing. Each operation is described now in detail.

The pseudo-deblending operation (1) may be described by the following pseudo-code: (A) loop through shot excitation times, (B) loop through receivers, and (C) truncate the record to the earth response time.

When looping through shot excitation times, a listening time segment for the current shot (i.e., shot excitation time to shot excitation time plus the listening time) is extracted. Acquisition-related coordinates (e.g., shot-x, shot-y, receiver-x, receiver-y, midpoint-x, midpoint-y, inline, crossline, etc.) may be associated with this segment.

Further, designature (or adjoint resignature) based on the signature of the source as previously discussed is applied when looping through shot excitation times. This correction may include source array (group) response, source ghost, source static correction, amplitude correction, e.g., based on source coupling.

When looping through receivers, receiver response corrections (adjoint receiver response filters) may be applied. These corrections relate to receiver group response, receiver ghost, receiver static correction, and amplitude correction, e.g., based on receiver coupling.

The result of the pseudo-deblending operation (1) is a 2D or 3D volume of traces for each receiver, each trace being related to an individual shot and receiver position.

During operation (2), the cross-talk noise estimate CN resulting from a previous iteration of operations (2), (3), (4.i), (4.ii) and (4.iii) is subtracted from the pseudo-blended data $D_{PD}$ to obtain the current denoised data $D_{DN}$. In the first iteration, the cross-noise estimate is zero, so the denoised data $D_{DN}$ is the pseudo-blended data $D_{PD}$. The current denoised data $D_{DN}$ is a "conservative estimate" of the blended dataset because it contains all the unblended signal (i.e., the theoretical data that would have been recorded in a non-blended acquisition) plus some cross-talk noise. With the iterations, the cross-talk noise component of $D_{DN}$ is reduced, and $D_{DN}$ converges to the deblended data $D_{DB}$ "from the top."

The filtering operation (3) removes cross-talk noise from the current denoised data $D_{DN}$ to obtain a current estimate of deblended data, $D_E$. The current estimate of deblended data $D_E$ is a "non-conservative estimate" of the deblended dataset because it does not contain any cross-talk noise, but does not preserve the entire unblended signal. With the iterations, the unblended signal's energy is recovered more and more, and $D_E$ converges with the deblended data $D_{DB}$ "from the bottom."

This filter is a harsh process in the first iterations, retaining only the continuous events in the data. With successive iterations, filtering harshness may be relaxed. In one embodiment, the type of filter may be changed from iteration to iteration. Filtering may also remove the cross-talk energy and may include a combination of individual operations. A non-exhaustive list of filtering options includes: FK, POCS, FX prediction, FX projection, curvelet, wavelet, Radon, coherency, common reflection surface, temporal frequency, anti-leakage Fourier or tau-p transform or similar (as described, e.g., in the article, "Multi-dimensional coherency driven denoising of irregular data," by Poole, G., published in *EAGE conference proceedings,* 2011) rank reduction related methods (as described, e.g., in the article, "F-xy eigenimage noise suppression," by Trickett, S., published in *Geophysics* 68, 2003, pp. 751-759), rank reduction tensor methods (as described, e.g., in the article, "Interpolation using Hankel tensor completion," published in *SEG Technical Program Expanded Abstracts* 2013, pp. 3,634-3,638), robust rank reduction methods (as described, e.g., in the article, "Robust rank-reduction filtering for erratic noise," by Trickett, S. et al., in *SEG* 2012), time frequency denoising (as described, e.g., in the article, "Time-frequency seismic data denoising," by Elboth et al., published in *Geophysical Prospecting* 58, 2010, pp. 441-453). All articles mentioned in this paragraph are incorporated in their entirety herein by reference.

The filter may include one or more spatial dimensions, depending on the geometry and on the filter method. For example, in the case of a towed streamer acquisition using two or more sources attached to the same vessel (often termed flip and flop sources) or to different vessels, it is possible to apply the denoising algorithm in 2D, in the common channel, common receiver, common cmp, or other domain where cross-talk noise may be largely non-continuous/coherent. Filtering may be applied successively using more than one algorithm either within one deblending iteration or a change of algorithm with iteration. The filters may be applied in different domains, for example, applying rank reduction filtering in the common channel domain followed by applying FK filtering in the receiver gather domain. The use of multi-dimensional spatial filtering (e.g. 3D) may also be used, for example, in the shot-channel domain. While the data from both sources is continuous in the shot domain, the use of the algorithm in this way ensures the noise model is consistent from channel to channel.

In another example, if in OBN acquisition shot positions provide 3D coverage, there are different flexibilities for filter application. For example, filtering may be applied in the inline direction followed by the crossline direction, or, 3D filtering may be directly applied.

The dimensions in which the filter is applied depend on the filter. The filter can be applied in subsets of the dataset, including temporal and spatial sub-windows, or sections (i.e., each line can be processed separately if required, for example, in the case of a towed streamer). The results from each sub-window may be combined, often using tapering.

The filter can be applied directly to $D_{DN}$, or it can be encompassed by a move-out correction and a reverse move-out correction. The use of a move-out correction (e.g., NMO or other corrections) may reduce the range of dips in the data, thus making it possible to constrain the filtering method (e.g., range of dips for a tau-p filter). By compensating for timing variations with offset, it may also be possible to constrain the filtering by using filters with similar properties for adjacent offsets.

The calculation of cross-talk estimate includes: synthetic blending (4.i), pseudo-deblending (4.ii) and calculating (4.iii) the difference between the re-blended estimate $D_{EB}$, (labeled 842 in FIG. 8) and the pseudo-deblended data $D_{EPD}$, (labeled 844 in FIG. 8).

Synthetic blending (4.i) relates to the adjoint of pseudo-deblending and may contain corrections analogous to those introduced in (1). Synthetic blending may involve re-blend/re-signature/receiver response corrections (including optional factors described earlier at the source and the receiver sides) applied to the earth response time records $D_E$ to form a continuous recording trace $D_{EB}$.

In one embodiment, the synthetic blending includes:
a. extending the earth response time records by the duration of the source signature and receiver response filters, so that the records have the length of the listening time;
b. convolving the extended records with the associated source signatures and receiver response operators; alternatively, this operation may be defined as the adjoint of designature and receiver response correction; in the frequency domain this step would relate to multiplication by the complex conjugate;
c. re-blending the data, by initializing a blank continuous recording record, and then looping through the shot firings to look up the firing time of the current shot, and adding in the record obtained in step b to the continuous recording trace.

Pseudo-deblending (4.ii) is similar to pseudo-deblending (1), and has estimate $D_E$ as input outputting the pseudo-deblended data $D_{EPD}$. Through iterations, the filter becomes less and less harsh until an iteration exit condition is met.

The current cross-talk noise $CN = D_{EPD} - D_E$ is then calculated and provided for a next subtraction operation (2).

The final filtering (5) occurs after the iteration exit condition is met. A final filter, for example, a frequency filter and/or a filter able to remove outliers, can be applied to the current denoised data $D_{DN}$ or to the estimate $D_E$, or to a combination of both to obtain the deblended data $D_{DB}$ (labeled 860 in FIG. 8). The iteration exit conditions can be, for example: a maximum number of iteration is reached, the filter used during iteration becomes mild enough, or the difference between $D_{DN}$ and $D_E$ becomes small enough.

The above-outlined methods subtract more and more accurate cross-talk estimates from the pseudo-deblended data ($D_{PD}$) with successive iterations. This approach differs from an alternative algorithm where both the cross-talk noise and spatially consistent signal are played down with successive iterations. The methods may be performed by a dedicated data processing apparatus, and/or may be embodied into computer-executable codes non-transitorily stored on computer-readable storing media.

On a separate note, the generalized use of rank-reduction filtering, in particular the robust rank-reduction filtering and the rank-reduction filtering for erratic noise described in Trickett et al. 2012, and the rank-reduction filter using the Hankel tensor described in Trickett et al. 2013, can be used for cross-talk noise attenuation related to simultaneous shooting. While the above discussion relates to simultaneous shooting, the methodologies may also be applied to remove interference noise relating to the acquisition of a different survey going on nearby.

The disclosed embodiments provide methods and devices for processing seismic data, in which models of the signal and/or of the noise are generated using data-domain weights determined based on estimated signal-to-noise ratios. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element may be usable alone without the other features and elements of the embodiments or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

The invention claimed is:

1. A method for removing noise from seismic data recorded by receivers over an underground formation, the data representing overlapping signals carrying structural information, the method comprising:
   selecting a spatio-temporal block of data focusing on one of the overlapping signals at a specific location, from the seismic data;
   estimating signal-to-noise ratios of data in the spatio-temporal block of data, for the one of the overlapping signals that is coherent with first seismic waves used to explore the underground formation and the noise that includes other of the overlapping signals;
   determining data-domain weights associated to the data, the data-domain weights being determined based on the estimated signal-to-noise ratios;
   generating a model of the one of the overlapping signals and/or a model of the noise from the seismic data using the data-domain weights thereby separating the one of the signals from the overlapping signals; and
   creating an image of the underground formation using the model of the one of the overlapping signals and/or the model of the noise to search and evaluate subterranean hydrocarbon deposits.

2. The method of claim 1, wherein the data-domain weights are used to derive a model of the data.

3. The method of claim 2, wherein the model is an anti-leakage Radon transform.

4. The method of claim 3, further comprising:
   determining an order used when applying the anti-leakage Radon transform to the spatio-temporal block of data, the order being determined based on the data-domain weights.

5. The method of claim 2, wherein a model-domain signal is obtained using an inversion.

6. The method of claim 5, wherein the data domain weights are used as constraints for the inversion.

7. The method of claim 1, further comprising:
   re-estimating the signal-to-noise ratios based on the model of the one of the overlapping signals and/or the model of the noise;
   recalculating the data-domain weights based on the re-estimated signal-to-noise ratios; and
   updating the model of the one of the overlapping signals and/or the model of the noise using the recalculated data-domain weights.

8. The method of claim 7 wherein the re-estimating, the recalculating and the updating are performed iteratively until a predetermined criterion is met.

9. The method of claim 1, further comprising:
   decreasing at least one weight among the data-domain weights, the at least one weight being selected based on a statistical analysis of the data.

10. The method of claim 1, further comprising:
    attenuating the noise in the spatio-temporal block of data using the model of the one of the overlapping signals and/or the model of the noise.

11. The method of claim 1, further comprising:
    evaluating the signal for seismic data other than data included in the spatio-temporal block of data, using the model of the signal.

12. The method of claim 1, further comprising:
    excluding one or more weights corresponding to a subset of the spatio-temporal block of data, from the data-domain weights used to generate the model of the one of the overlapping signals and/or the model of the noise; and
    interpolating the one of the overlapping signals and/or the noise for the subset of the spatio-temporal block of data using the model of the one of the overlapping signals and/or the model of the noise.

13. The method of claim 1, further comprising:
    estimating second signal-to-noise ratios of the data in the spatio-temporal block of data, for a second one of the overlapping signals that is coherent with second seismic waves used to explore the underground formation and a second noise;
    determining second data-domain weights associated to the data, the second data-domain weights being determined based on the estimated second signal-to-noise ratios; and
    generating a second model of the second one of the overlapping signals and/or a second model of the second noise using the second data-domain weights,
    wherein at least some of the receivers detected simultaneously the one of the overlapping signals coherent with the first waves and the second one of the overlapping signals coherent with the second seismic waves.

14. The method of claim 13, further comprising:
re-estimating the signal-to-noise ratios and/or the second signal-to-noise ratios based on the model of the one of the overlapping signals, the model of the noise, the second model of the second one of the overlapping signals and/or the second model of the second noise, respectively;
recalculating the data-domain weights and/or the second data-domain weights based on the re-estimated signal-to-noise ratios and/or the re-estimated second signal-to-noise ratios, respectively; and
updating the model of the one of the overlapping signals, the model of the noise, the second model of the second one of the overlapping signals and/or the second model of the second noise using the recalculated data-domain weights and/or the recalculated second data-domain weights.

15. The method of claim 14,
the re-estimating, the recalculating and the updating are performed iteratively until one or more predetermined criteria are met.

16. The method of claim 15, further comprising:
determining a first level of similarity between the model of the one of the overlapping signals and the second model of the noise and/or a second level of similarity between the second model of the second one of the overlapping signals and the model of the noise,
wherein the one or more predetermined criteria are related to the first and/or second levels of similarity.

17. The method of claim 13, further comprising:
deblending the spatio-temporal block of data into first data focusing on the one of the overlapping signals and second data focusing on the second one of the overlapping signals based on the model of the one of the overlapping signals, the second model of the second one of the overlapping signals, the model of the noise and/or the second model of the second noise.

18. The method of claim 1, further comprising:
calculating a changemap associating a noise measure to each data on a trace;
identifying at least one noise-dominated point based on the changemap; and
adjusting at least one of the data-domain weights associated to the at least one noise-dominated point.

19. An apparatus configured to remove noise from seismic data recorded by receivers over an underground formation, the data representing overlapping signals carrying structural information, the apparatus comprising:
an input/output interface configured to receive the seismic data and/or to output an image of the explored underground formation; and
a data processing unit configured
to select a spatio-temporal block of data focusing on one of the overlapping signals at a specific location, from the seismic data;
to estimate signal-to-noise ratios of data in the spatio-temporal block of data, for the one of the overlapping signals that is coherent with first seismic waves used to explore the underground formation and the noise that includes other of the overlapping signals;
to determine data-domain weights associated to the data, the data-domain weights being determined based on the estimated signal-to-noise ratios;
to generate a model of the one of the overlapping signals and/or a model of the noise from the seismic data using the data-domain weights thereby separating the one of the overlapping signals; and
to create the image of the explored underground formation using the model of the one of the overlapping signals signal and/or the model of the noise to search and evaluate subterranean hydrocarbon deposits.

20. A non-transitory computer readable medium storing executable codes which when executed by a computer make the computer to perform a method for removing noise from seismic data recorded by receivers over an underground formation, the data representing overlapping signals carrying structural information, the method comprising:
selecting a spatio-temporal block of data focusing on one of the overlapping signals at a specific location, from the seismic data;
estimating signal-to-noise ratios for data in the spatio-temporal block of data, for the one of the overlapping signals that is coherent with first seismic waves used to explore the underground formation and a noise that includes other of the overlapping signals;
determining data-domain weights associated to the data, the data-domain weights being determined based on the estimated signal-to-noise ratios;
generating a model of the one of the overlapping signals and/or a model of the noise from the seismic data using the data-domain weights thereby separating the one of the
overlapping signals; and
creating an image of the underground formation using the model of the one of the overlapping signals and/or the model of the noise to search and evaluate subterranean hydrocarbon deposits.

* * * * *